US010336136B2

(12) United States Patent
Heraudet et al.

(10) Patent No.: US 10,336,136 B2
(45) Date of Patent: Jul. 2, 2019

(54) WHEEL CARRIER ASSEMBLY WITH DISK BRAKE

(71) Applicant: SAME DEUTZ-FAHR ITALIA S.p.A., Treviglio, Bergamo (IT)

(72) Inventors: Laurent Heraudet, Bergamo (IT); Stefano Biffi, Bergamo (IT)

(73) Assignee: SAME DEUTZ-FAHR ITALIA S.p.A., Treviglio, Bergamo (IT)

( * ) Notice: Subject to any disclaimer, the term of this patent is extended or adjusted under 35 U.S.C. 154(b) by 0 days.

(21) Appl. No.: 15/552,983

(22) PCT Filed: Feb. 23, 2016

(86) PCT No.: PCT/IB2016/050974
§ 371 (c)(1),
(2) Date: Aug. 23, 2017

(87) PCT Pub. No.: WO2016/135629
PCT Pub. Date: Sep. 1, 2016

(65) Prior Publication Data
US 2018/0015782 A1    Jan. 18, 2018

(30) Foreign Application Priority Data

Feb. 24, 2015  (IT) .............................. BS2015A0025

(51) Int. Cl.
*B62D 7/18*   (2006.01)
*B60B 35/00*  (2006.01)
(Continued)

(52) U.S. Cl.
CPC .......... *B60B 35/003* (2013.01); *B60B 35/122* (2013.01); *B60B 35/128* (2013.01);
(Continued)

(58) Field of Classification Search
CPC ... B60B 35/003; B60B 35/122; B60B 35/128; B60B 35/125; B60B 35/16; B62D 7/18; F16D 55/00; F16D 65/0068; F16D 65/123
See application file for complete search history.

(56) References Cited

U.S. PATENT DOCUMENTS

2017/0259800 A1* 9/2017 Fulton ................... B60G 7/001
2018/0126782 A1* 5/2018 Sinka .................. B60B 27/0052
2018/0237070 A1* 8/2018 Lorenz ..................... B60G 7/02

FOREIGN PATENT DOCUMENTS

CN        1541903 A      11/2004
DE    10 2013 206 545 A1   10/2014
(Continued)

OTHER PUBLICATIONS

International Search Report and Written Opinion of the International Searching Authority for corresponding International Patent Application No. PCT/IB2016/050974 dated Jun. 27, 2016, 10 pages.

*Primary Examiner* — Joseph M Rocca
*Assistant Examiner* — Marlon A Arce
(74) *Attorney, Agent, or Firm* — Merchant & Gould P.C.

(57) ABSTRACT

A wheel carrier assembly (10) of a machine for agricultural use, such as a tractor, has a drive axle (2) and steering wheels. The wheel carrier assembly (10) includes a constant-velocity joint (100) for the connection, upstream, of the wheel carrier assembly (10) to the transmission. The assembly includes, downstream, a rotation shaft (101) for the rotation of the wheel assembly. A disc brake device (200) controls the braking of the wheel assembly. A gear reducer (300), connects to the wheel assembly and to the rotation shaft (101). The disc brake device (200) is operationally (Continued)

connected to the rotation shaft (101) so that the braking action is applied directly on the rotation shaft, upstream of the gear reducer (300).

10 Claims, 5 Drawing Sheets

(51) Int. Cl.
*B60B 35/12* (2006.01)
*F16D 55/00* (2006.01)
*F16D 65/18* (2006.01)
*F16D 65/00* (2006.01)
*F16D 65/12* (2006.01)
*B60K 17/04* (2006.01)
*B60B 35/16* (2006.01)
*F16D 65/02* (2006.01)

(52) U.S. Cl.
CPC ............... *B62D 7/18* (2013.01); *F16D 55/00* (2013.01); *F16D 65/0068* (2013.01); *F16D 65/123* (2013.01); *F16D 65/183* (2013.01); *B60B 35/125* (2013.01); *B60B 35/16* (2013.01); *B60B 2900/541* (2013.01); *B60K 17/046* (2013.01); *B60Y 2200/221* (2013.01); *F16D 2055/0008* (2013.01); *F16D 2065/1364* (2013.01); *F16D 2065/1376* (2013.01); *F16D 2065/1384* (2013.01); *F16D 2065/1388* (2013.01)

(56) References Cited

FOREIGN PATENT DOCUMENTS

| | | |
|---|---|---|
| EP | 0 084 687 A1 | 8/1983 |
| GB | 1 483 731 A | 8/1977 |
| KR | 2014-0142479 A | 12/2014 |

* cited by examiner

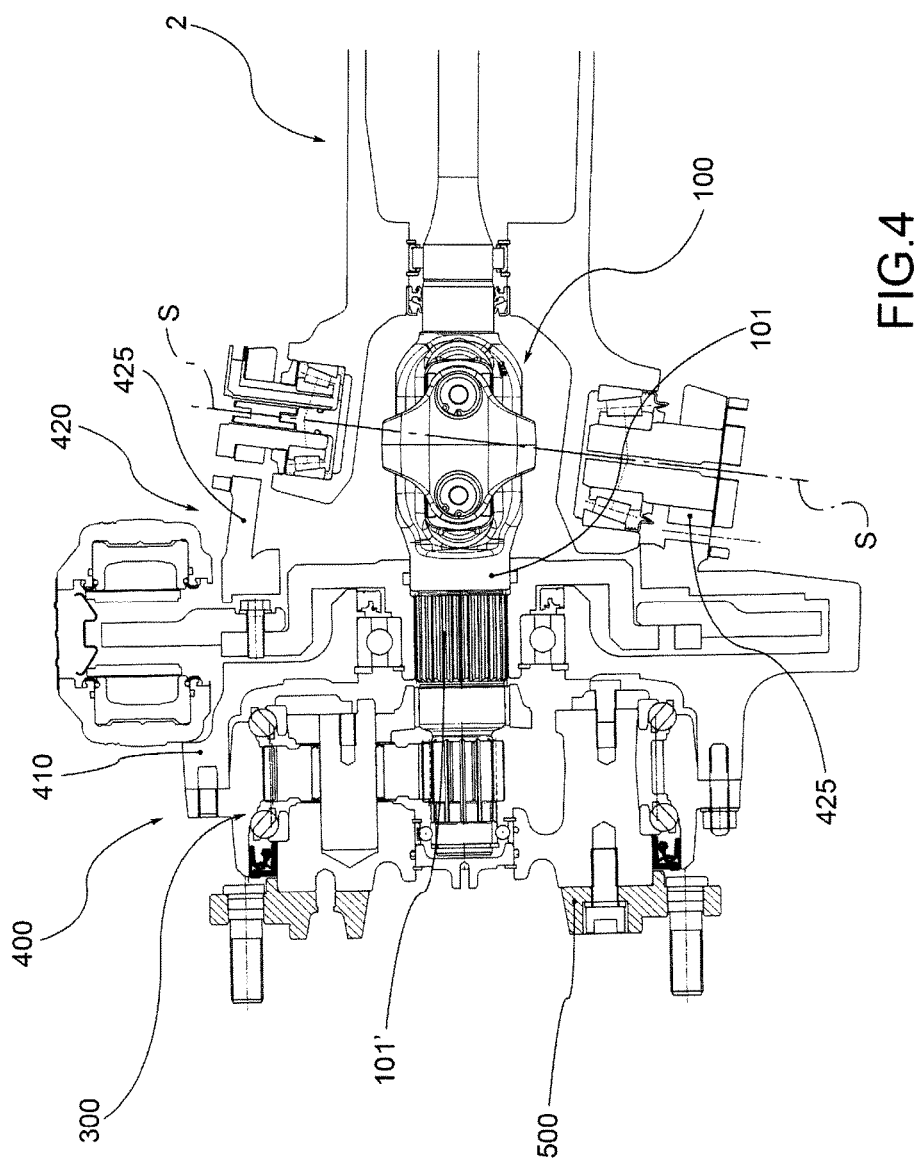

WHEEL CARRIER ASSEMBLY WITH DISK BRAKE

This application is a National Stage Application of PCT/IB2016/050974, filed 23 Feb. 2016, which claims benefit of Serial No. BS2015A000025, filed 24 Feb. 2015 in Italy and which applications are incorporated herein by reference. To the extent appropriate, a claim of priority is made to each of the above disclosed applications.

FIELD OF APPLICATION

Objects of present invention are a wheel carrier assembly of a vehicle for agricultural use and the vehicle itself that comprises it; in particular, such vehicle is a tractor. Specifically, the vehicle for agricultural use has drive means comprising transmission means and a steering axle connectable to the transmission means; the wheel carrier assembly of the present invention is connectable to the axle.

In the following description, the term "tractor" means both agricultural tractors and, more generally, the earthmoving machinery derived from agricultural tractors. Generally, the term "tractor" refers to vehicles of large dimensions, specifically for the execution of power actions.

The term "wheel carrier assembly" identifies the assembly of components specifically suitable to support and, if necessary, guide in movement a "wheel assembly", regardless of the type of wheel, tyre or rim, single or twin.

Preferably, the present invention relates to a wheel carrier assembly suitable to be connected to a steering axle. Therefore, the wheel carrier assembly must be suitable for moving the respective wheel carrier in rotation, for example around a steering axis.

STATE OF THE ART

It should be noted that a historic solution, moreover, introduced by the Applicant in the 1950s, is that of applying a gear reducer to the wheel of a vehicle for agricultural use as the last component of the kinematic transmission chain, housing it in the wheel carrier assembly.

In the state of the art, wheel carrier assembly solutions are known comprising braking systems with oil bath brake, positioned upstream of said gear reducer. Or again, solutions are known in which the braking system comprises a disc brake substantially connected, for example by means of a flange, the wheel assembly; in other words, in these embodiments, the disc brake operates downstream of the gear reducer.

In yet other words, in wheel carrier assemblies comprising known gear reducers, the oil bath braking systems are positioned outside of the wheel carrier assembly so as to maintain this latter of compact size, however, complicating the layout of the kinematic chain. Or, the choice is to use a disc brake not operating on the kinematic transmission chain, thus avoiding complicating it, placing it downstream of it.

Both the aforesaid solutions have a plurality of disadvantages. One of the aforesaid disadvantages is related to the layout of the kinematic chain of the vehicle, and in particular to the difficulties of positioning the braking system itself. Another disadvantage is related to the actuation of the braking action of braking that, as it was found, has a particularly problematic braking progressiveness, especially at low speeds.

PRESENTATION OF THE INVENTION

The objective of the present invention is to provide a wheel carrier assembly connectable to a steering and drive axle, i.e., comprising transmission means, such that the braking is optimal and progressive.

DESCRIPTION OF THE DRAWINGS

The characteristics and advantages of the wheel carrier assembly according to the present invention will be apparent from the following description, given by way of non-limiting example, in accordance with the accompanying figures, in which:

FIG. 4 shows a wheel carrier assembly in accordance with that shown in the preceding figures, mounted on an axle of a vehicle, along a transverse section plane V-V.

DETAILED DESCRIPTION

In accordance with the accompanying figures, reference number 1 indicates a tractor in its entirety.

The tractor 1 comprises drive means, specifically for the movement of the tractor, for example, comprising an internal combustion engine, including the related transmission means for the transmission of motion to the wheel assemblies. In addition, the tractor 1 comprises a steering axle 2 connectable to or comprising said transmission means, in other words the steering axle 2 is a drive axle. The axle 2 extends along an axle axis A-A, typically transverse, i.e., perpendicular to the longitudinal axis of movement of the tractor 1.

Figure 1:
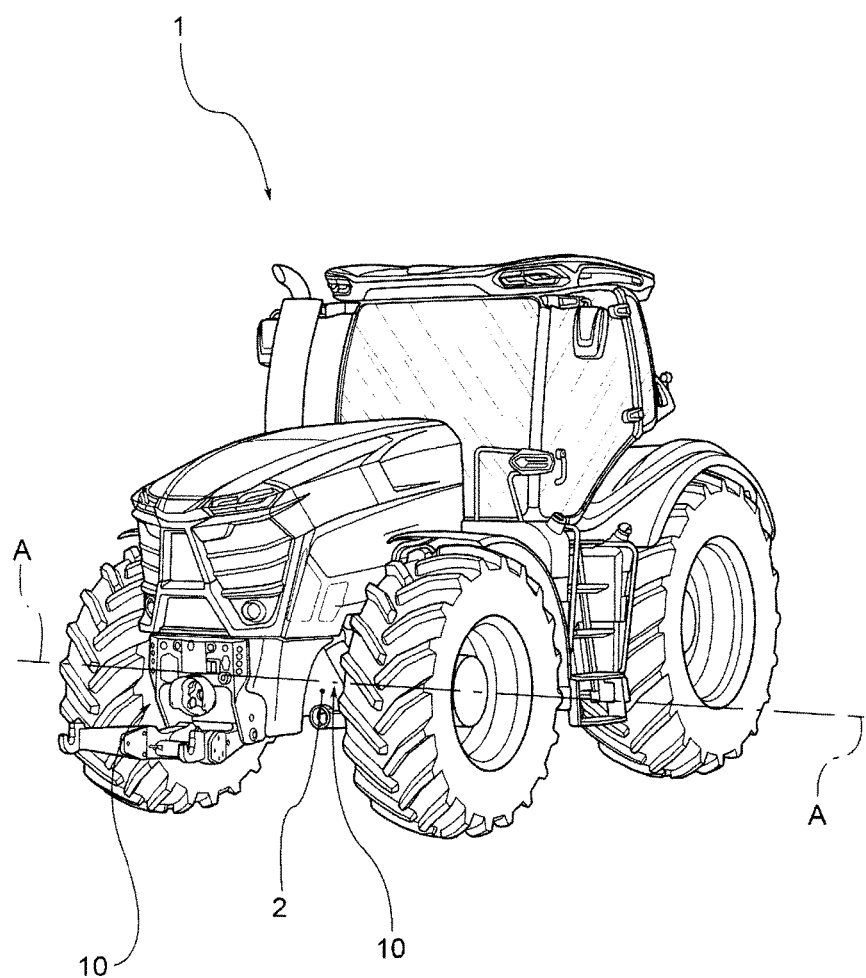
FIG. 1 shows a tractor in its entirety, comprising at least one wheel carrier assembly, according to a preferred embodiment.
Figure 2A:
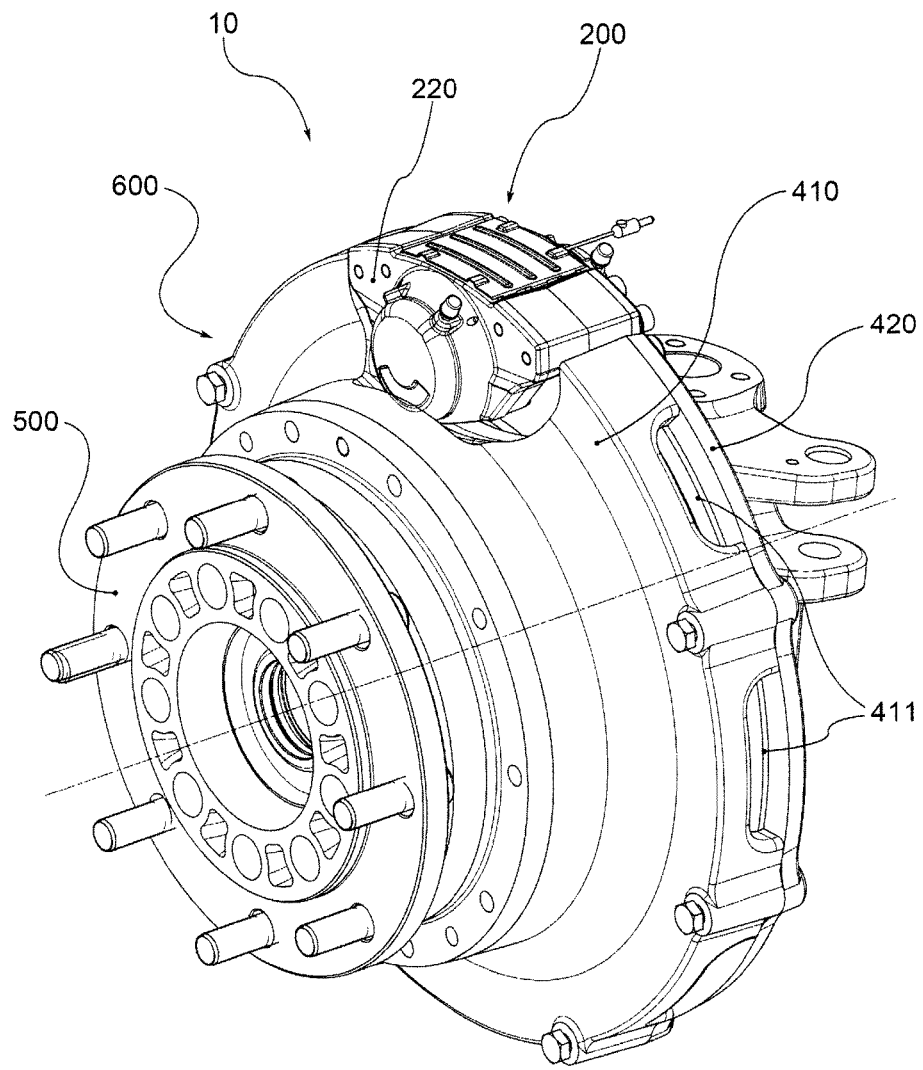
FIGS. 2a and 2b show two perspective views of a wheel carrier assembly according to a preferred embodiment.
Figure 2B:
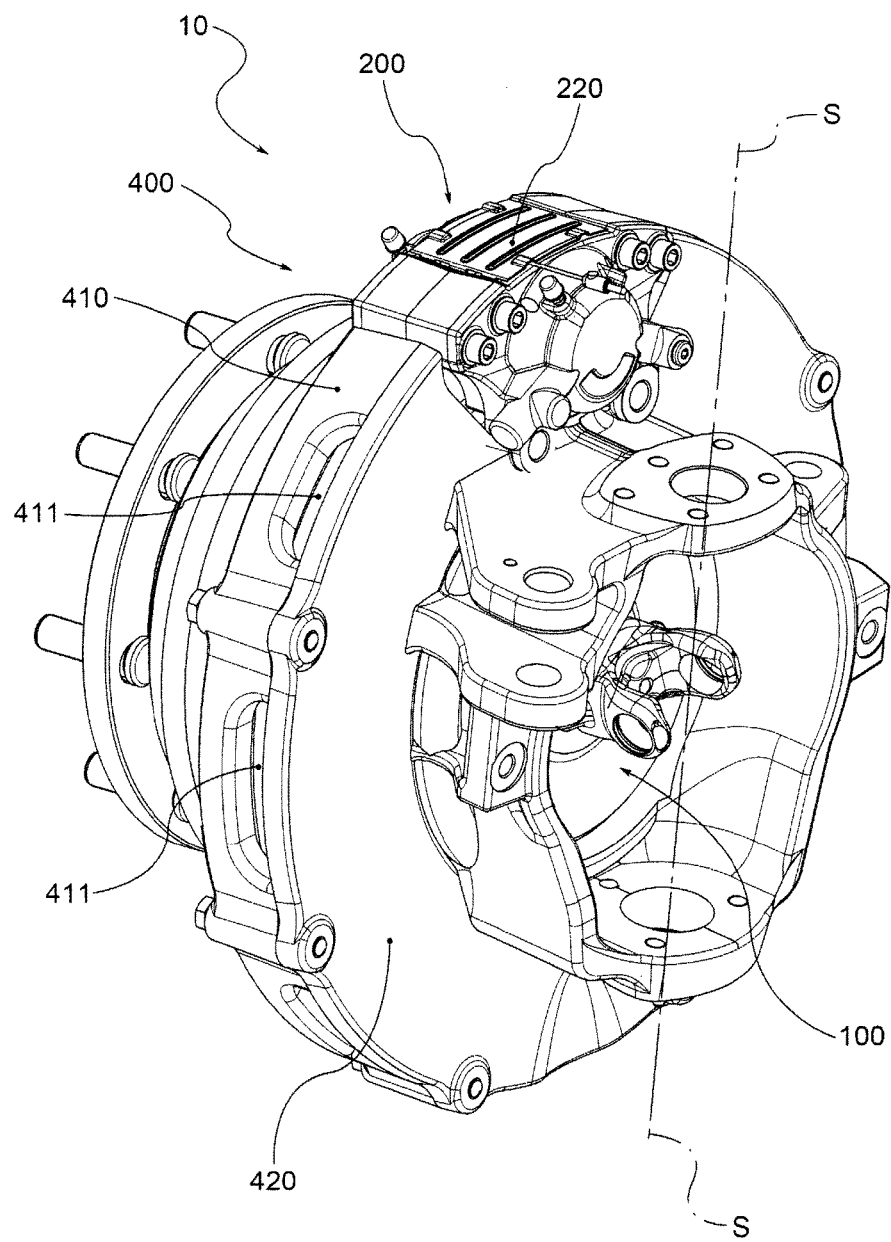
Figure 3:
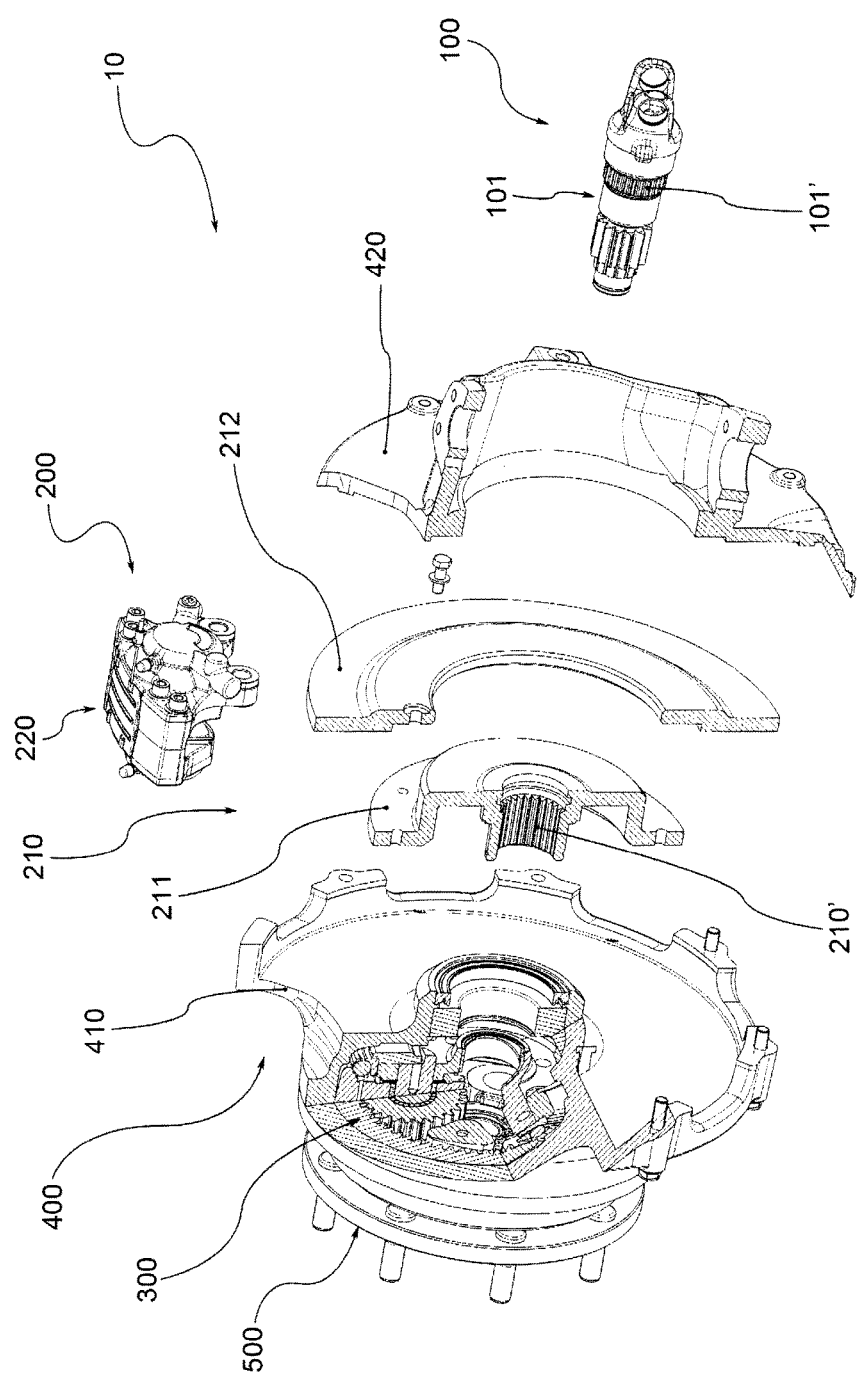
FIG. 3 illustrates a separate parts perspective view of the wheel carrier assembly referred to in FIGS. 1a and 1b, in which several of the components comprised in it are shown in section along a transverse plane V-V.

Preferably, said steering axle 2 is the front axle of the tractor 1, as shown in FIG. 1.

In addition to the tractor 1, the present invention relates to a wheel carrier assembly 10 of a vehicle for agricultural use such as the tractor 1 referred to above.

Specifically, the wheel carrier assembly 10 is connectable to the axle 2 to support and control in motion a wheel assembly fixed to it on a wheel flange 500.

According to a preferred embodiment, the wheel carrier assembly 10 connected comprises a constant-velocity joint 100 connected, upstream, to the transmission means, and comprising, downstream, a rotation shaft 101 for the rotation of the wheel assembly. By means of the constant-velocity assembly 100, the steering of the wheel carrier assembly 10 is thus allowed, ensuring the motility of the wheel. In fact, the constant-velocity joint 10 is suitable to transmit a rotary motion to the rotation shaft 101; in particular, the speed transmitted by the transmission means, specifically by the differential, is transmitted as input to the constant-velocity joint; thanks to the constant-velocity joint 101 such transmission occurs by allowing the misalignment of their axes of rotation.

The present invention is not limited to the type of constant-velocity joint 10 or to the arrangement of the constant-velocity joint 10, for example constituted by a cardan joint or more than one.

According to a preferred embodiment, the wheel carrier assembly 10 also comprises a gear reducer 300 connected to the wheel assembly and to the rotation shaft 101, suitable to vary the rotation speed of the rotation shaft 101. Preferably, thanks to the gear reducer 300, the revolutions, and thus the rotation speed, of the kinematic chain comprising the transmission means, are provided in high numbers, and are then reduced by the gear reducer itself, before arriving to the respective wheel assembly.

According to a preferred embodiment, the rotation shaft 101 is the input shaft of the gear reducer 300, also known as "sun gear".

Preferably, the gear reducer 300 is a planetary gear reducer.

According to a preferred embodiment, the wheel carrier assembly 10 also comprises a disc brake device 200 suitable to brake the wheel assembly.

According to a preferred embodiment, the disc brake device 200 comprises at least one brake disc 210 and at least one brake calliper 220.

Preferably, the disk brake 210 is operatively connected to the shaft 101, upstream the gear reducer 300, so that the braking action is applied directly to said shaft 101.

In other words, the braking action is performed through the disc brake device 200 upstream of the gear reducer 300.

Preferably, the brake disc 210 is integrally fixed to the rotation shaft 101, so as to discharge its action as much as possible and as effectively as possible on the rotation shaft 101.

Preferably, the rotation shaft 101 and the brake disc 210 are constrained in rotation to each other by locking means.

For example, the locking means comprise locking pins or locking keys such as to allow an angular locking of the disc brake 210 on the shaft.

In a preferred embodiment, the locking means comprise a shaft toothing 101' and a brake toothing 210' respectively made on the rotation shaft 101 and on the brake disc 210 respectively complementary to each other, for the threading of the brake disc 210 onto the rotation shaft 101 in the axial direction. In this manner, an angular locking is guaranteed between the two components of a multiplicity of points, angularly equidistant.

According to a further preferred embodiment, the brake disc 210 comprises a shaft portion 211 engaged with the rotation shaft 101 and a braking band portion 212 on which the brake calliper 220 acts, mutually integrally connected.

In a preferred embodiment, the shaft portion 211 and the braking band portion 212 are connected to each other by attachment means, such as screws.

In other words, the brake disc 210 is designed in such a way that it is divided into two portions having specific purposes: the shaft portion 211 is suitable to engage the rotation shaft 101, for example comprising the brake toothing 210', while the braking band portion 212 is instead engaged by the brake calliper 220 and develops a braking action by friction.

Preferably, the shaft portion 211 is made of steel.

Preferably, the braking band portion 212 is made of a material suitable to ensure friction with the brake calliper 220, for example lamellar cast iron.

Preferably, the braking band portion 212 is a full, ventilated or petal component. In addition, the braking band portion 212 has a smooth, drilled, or perforated, slotted or segmental surface.

According to the aforesaid embodiment, during maintenance only the braking band portion 212 is replaceable, for example due to wear, by dismounting it from the shaft portion 211, which remains engaged to the rotation shaft 101. Preferably, the braking band portion 212 is constituted in turn of several portions, so as to facilitate maintenance.

Note that in further preferred embodiments, the brake disc 210 is in one piece, and comprises the shaft portion 211 and the braking band portion 212.

In a still further embodiment, the shaft portion 211 and the rotation shaft 101 are made in one piece.

According to an embodiment, the wheel carrier assembly 10 comprises a container body 400 comprising, mutually interconnected, a box-shaped portion 410 and a steering fork portion 420.

In other words, the box-shaped portion 410 is suitable to contain the gear reducer 300 and the brake disc 210.

Preferably, the steering fork portion 420 comprises seats 425 of a steering axis S-S, i.e., the axis of rotation around which the wheel carrier assembly 10, and thus the wheel assembly, is suitable to be moved in rotation, for example by the steering arm. Preferably, in the seats 425 are housable the respective steering joints.

In a preferred embodiment, the box-shaped portion 410 is a gear reducer box designed in such a way to be able to also house the brake disc 210.

Preferably, the brake calliper 220 is on board the container body 400, insertable on it radially, for example fixed to the box-shaped portion 410 or to the steering fork portion 420.

Preferably, the container body has radial ventilation openings 411, such as to permit the access of fresh air and the outlet of hot air from inside it, so as to avoid overheating of the brake disc 210.

Innovatively, the wheel carrier assembly of the present invention allows achieving the intended purpose of the invention, i.e., to provide a wheel carrier assembly that easily placeable in the kinematic chain, connectable to a steering and drive axle, having an optimal braking capacity.

Advantageously, this solution finds applications in slow-moving vehicles, such as vehicles for agricultural use such as a tractor. Due to the presence of low speeds, the solutions of the prior art with disc brake flanged to the wheel have ineffective braking: in fact, the low speeds of the vehicle give rise to low peripheral speeds between the disc brake and brake calliper, which as a consequence have problems in braking progressivity. Advantageously the solution of the present invention, by acting at high speeds, namely those input to the gear reducer, has better braking progressivity. Advantageously, the benefit of increased braking capacity is also obtained.

Moreover, advantageously, the brake disc has small dimensions so as to be easily accommodated in the container body of the wheel carrier.

A further advantage resides in the fact that, compared to solutions of the known art with oil bath braking systems inside the wheel carrier assembly, the solution of the present invention significantly reduces power absorption.

A still further advantage resides in the fact that, in the solution of the present invention, the brake does not transmit energy or heat the oil in the gear reducer, as instead is the case in the aforesaid known solutions with oil bath braking systems, causing deducible damage to the functioning of the gear reducer.

Advantageously, the braking of a disc brake is easily modulable as a function of the requested need. In other words, as a function of the braking capacity required by the vehicle, the action of the brake disc is controllable and easily modulable by means of the brake calliper.

Moreover, advantageously, the constant-velocity joint is not affected by the braking forces. In other words, the constant-velocity joint, and thus even more so in a configuration in which the wheel assembly is steered, is not stressed by the braking action occurring downstream of it. In other words, the constant-velocity joint is therefore smaller in size, but sufficient to withstand the action of the traction torque.

Moreover, a further advantage resides in the fact that the solution of the present invention is extremely versatile and therefore customisable in such a way as to allow additional evolutionary steps such as further dimensioning of the various components.

Advantageously, the wheel carrier assembly is suitable to be applied on tractors, and in particular, is extraordinary effective in solutions in which it is applied to the front axles.

In fact, advantageously, being of extraordinarily compact size, the wheel carrier assembly finds specific application on front axles, bringing all the above advantages to them.

A further advantage resides in the fact that, on the tractor, the movement of the braking distribution to the front axle, i.e., the transmission of the braking action from the rear axis to the front axis through the kinematic chain, can be minimised or actually avoided.

Advantageously, in the tractor, total braking capacity distributed up to 70% to the front are achievable.

A further advantage thus lies in the fact that, at the front axle the tractor has a particular braking readiness, for example the braking on the front wheels is manageable in such a way that it is contemporary or even takes place prior to the braking on the rear wheels.

Yet another advantage can thus be foreseen in a possible reduction of the dimensions of brakes at the rear axle of the tractor.

It is clear that one skilled in the art, in order to meet specific needs, may make changes to the wheel carrier assembly, or to the tractor, described above, all contained within the scope of protection defined by the following claims.

The invention claimed is:

1. Wheel carrier assembly of a vehicle for agricultural use, wherein the vehicle has a drive comprising a transmission and a steering axle connectable to the drive, wherein the wheel carrier assembly is connectable to the axle to support and control in movement a wheel assembly attached thereto on a wheel flange, wherein the wheel carrier assembly comprises:
   a constant-velocity joint connected, upstream, to the transmission, and comprising, downstream, a rotation shaft for rotation of the wheel assembly;
   a disc brake device to brake the wheel assembly; a gear reducer, connected to the wheel assembly and to the rotation shaft, to vary rotation speed of the rotation shaft;
   wherein the disc brake device comprises at least one brake disc and at least one brake caliper wherein the brake disc is operatively connected to the rotation shaft, upstream of the gear reducer, wherein braking action is applied directly to said shaft;
   wherein the rotation shaft and the brake disc are constrained in rotation to each other by a lock;
   wherein the lock comprises a shaft toothing and a brake toothing respectively made on the rotation shaft and on the brake disc respectively complementary to each other, for threading of the brake disc onto the rotation shaft in an axial direction.

2. Wheel carrier assembly according to claim 1, wherein the brake disc is integrally attached to the rotation shaft.

3. Tractor comprising a steering axle comprising a movement transmitter to which steered wheels are connected by a wheel carrier assembly according to claim 1.

4. A wheel carrier assembly of a vehicle for agricultural use, wherein the vehicle has a drive comprising a transmission and a steering axle connectable to the drive, wherein the wheel carrier assembly is connectable to the axle to support and control in movement a wheel assembly attached thereto on a wheel flange, wherein the wheel carrier assembly comprises:
   a constant-velocity joint connected, upstream, to the transmission, and comprising, downstream, a rotation shaft for rotation of the wheel assembly;
   a disc brake device to brake the wheel assembly; a gear reducer, connected to the wheel assembly and to the rotation shaft, to vary rotation speed of the rotation shaft;
   wherein the disc brake device comprises at least one brake disc and at least one brake caliper wherein the brake disc is operatively connected to the rotation shaft, upstream of the gear reducer, wherein braking action is applied directly to said shaft;
   wherein the brake disc comprises a shaft portion engaged with the rotation shaft and a braking band portion on which the brake caliper acts, mutually integrally connected.

5. Wheel carrier assembly according to claim 4, wherein the shaft portion and the braking band portion are connected to each other.

6. Wheel carrier assembly according to claim 4, wherein the shaft portion and the rotation shaft are made in one piece.

7. A Wheel carrier assembly of a vehicle for agricultural use, wherein the vehicle has a drive comprising a transmission and a steering axle connectable to the drive, wherein the wheel carrier assembly is connectable to the axle to support and control in movement a wheel assembly attached thereto on a wheel flange, wherein the wheel carrier assembly comprises:
   a constant-velocity joint connected, upstream, to the transmission, and comprising, downstream, a rotation shaft for rotation of the wheel assembly;
   a disc brake device to brake the wheel assembly; a gear reducer, connected to the wheel assembly and to the rotation shaft, to vary rotation speed of the rotation shaft;
   wherein the disc brake device comprises at least one brake disc and at least one brake caliper wherein the brake disc is operatively connected to the rotation shaft, upstream of the gear reducer, wherein braking action is applied directly to said shaft;
   a container body comprising, mutually interconnected:
      a box-shaped portion to contain the gear reducer and the brake disc;
      a steering fork portion, comprising seats of a steering axis.

8. Wheel carrier assembly according to claim 7, wherein the brake caliper is on board of the container body.

9. Wheel carrier assembly according to claim 7, wherein the brake caliper is attached to the steering fork portion.

10. Tractor according to claim 3, wherein said axle is the front axle.

* * * * *

UNITED STATES PATENT AND TRADEMARK OFFICE
CERTIFICATE OF CORRECTION

PATENT NO.        : 10,336,136 B2
APPLICATION NO.   : 15/552983
DATED             : July 2, 2019
INVENTOR(S)       : Heraudet et al.

Page 1 of 1

It is certified that error appears in the above-identified patent and that said Letters Patent is hereby corrected as shown below:

On the Title Page

(30) Foreign Application Priority Data: "Feb 24, 2015 (IT) BS2015A0025" should read -- Feb 24, 2015 (IT) BS2015A000025 --

Signed and Sealed this
Twelfth Day of November, 2019

Andrei Iancu
*Director of the United States Patent and Trademark Office*